(12) United States Patent
Bistry et al.

(10) Patent No.: US 12,154,292 B2
(45) Date of Patent: Nov. 26, 2024

(54) METHOD FOR DETERMINING AN ORIENTATION OF AN INDUSTRIAL TRUCK

(71) Applicant: Jungheinrich Aktiengesellschaft, Hamburg (DE)

(72) Inventors: Hannes Bistry, Pinneberg (DE); Benjamin Bruss, Hamburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 311 days.

(21) Appl. No.: 17/591,662

(22) Filed: Feb. 3, 2022

(65) Prior Publication Data
US 2022/0245854 A1 Aug. 4, 2022

(30) Foreign Application Priority Data
Feb. 4, 2021 (DE) .................... 10 2021 102 633.4

(51) Int. Cl.
| | | |
|---|---|---|
| *G06T 7/00* | (2017.01) | |
| *G01B 11/26* | (2006.01) | |
| *G06T 7/13* | (2017.01) | |
| *G06T 7/60* | (2017.01) | |
| *G06T 7/73* | (2017.01) | |

(52) U.S. Cl.
CPC ............... *G06T 7/73* (2017.01); *G01B 11/26* (2013.01); *G06T 7/13* (2017.01); *G06T 7/60* (2013.01); *G06T 2207/30252* (2013.01)

(58) Field of Classification Search
CPC .... G06T 7/73; G06T 7/13; G06T 7/60; G06T 2207/30252; G06T 2207/10004; G06T 2207/20024; G01B 11/26; G01B 11/24; B65G 1/0485; B65G 1/0492; G01C 3/24
See application file for complete search history.

(56) References Cited

U.S. PATENT DOCUMENTS

| | | | |
|---|---|---|---|
| 2019/0096080 A1 | 3/2019 | Liu | |
| 2020/0380294 A1* | 12/2020 | Zhai | ............... G06T 3/40 |
| 2020/0380694 A1* | 12/2020 | Chan | ............... G06T 7/11 |
| 2021/0248759 A1* | 8/2021 | Iizuka | ............. G06V 40/28 |

FOREIGN PATENT DOCUMENTS

EP 3151199 A2 4/2017

OTHER PUBLICATIONS

EP 22154327.5, filed Jan. 31, 2022, European Search Report dated Jul. 8, 2022 (8 pages).

* cited by examiner

*Primary Examiner* — Ping Y Hsieh
(74) *Attorney, Agent, or Firm* — Barclay Damon LLP (57) ABSTRACT

A method for determining an orientation of an industrial truck relative to a structure comprises recording an image of the structure using a camera mounted to the industrial truck, where the structure includes at least one horizontal element. At least two geometric quantities are determined from the recorded image that correspond to the at least one horizontal element. The at least two geometric quantities are then used to determine an angle of intersection between an image plane and a vertical plane through the at least one horizontal element.

15 Claims, 10 Drawing Sheets

METHOD FOR DETERMINING AN ORIENTATION OF AN INDUSTRIAL TRUCK

CROSS REFERENCE TO RELATED INVENTION

This application is based upon and claims priority to, under relevant sections of 35 U.S.C. § 119, German Patent Application No. 10 2021 102 633.4, filed Feb. 4, 2021, the entire contents of which are hereby incorporated by reference.

FIELD OF TECHNOLOGY

The present disclosure relates to a method for orienting an industrial truck.

BACKGROUND

Industrial trucks are frequently used in a warehouse environment in order to pick up and place down goods, loads, and other objects. The objects to be transported by the industrial truck are generally transported on load carriers and stored in racks and other storage spaces, for example. When picking up or placing down a load, it is important that the industrial truck is oriented correctly. The orientation with respect to the load or a structure in the warehouse region means, for example, an angle between the vehicle longitudinal direction and an edge or surface of the structure. Generally speaking, an industrial truck approaches a rack or load at a perpendicular angle thereto in order to pick up or place down the load.

BRIEF SUMMARY OF THE INVENTION

The object of the invention is to provide a method for determining an orientation of the industrial vehicle relative to a structure that can reliably determine the orientation of the industrial truck using the simplest means possible.

An embodiment of a method is provided and intended for determining an orientation of the industrial truck relative to a structure comprising horizontal elements. In the method, the industrial truck is equipped with a camera that is directed at the structure comprising the horizontal elements. An embodiment of the method according to the invention comprises a series of steps that are run through, wherein different sequential orders are possible for the steps, in particular for the image processing steps. In an embodiment, an image of the structure comprising at least one horizontal element is recorded. The image of the structure is a two-dimensional image that also contains the horizontal element. On account of the spatial orientation between the camera and the structure, horizontal lines in space do not extend horizontally in the recorded image. In another step, at least two geometric quantities are determined in the recorded image. Said geometric quantities may be points, lines, angles, or fields. The geometric quantities are assigned to the horizontal element or to part of the depiction of the horizontal element. Then, according to the invention, an angle of intersection between an image plane and a vertical plane through the horizontal element is determined using the at least two geometric quantities. The basic idea underlying this is that the two geometric quantities belong to an object that extends obliquely in the image and thus allow for identification of the angle of intersection, wherein the angle of intersection is also present between a plane parallel to the image plane and a vertical plane through the horizontal element.

In a preferred embodiment, an edge is identified in the recorded image. Edge detection in images is a method that is known per se. In the method according to the invention, edges which, according to their position, can originate from horizontal structures in space are preferably identified.

In a preferred embodiment, the two geometric quantities are image coordinates of a reference point in the image and an angle of inclination of the edge in the image. An angle of intersection can be determined from the reference value of the image coordinates (X, Y) and from an angle of inclination of the edge in the image by means of an assignment rule, for example. In an embodiment, the angle of the edge in the image is preferably determined for the angle of inclination of the edge. For this purpose, the slope of the edge in the image can be determined, for example.

In an alternative embodiment, which may of course also be used, the two geometric quantities are a distance and an offset angle to a point on the object. In this case, polar coordinates which, proceeding from the observing camera, describe a distance and an angle may be used as the two geometric quantities. Here, too, the angle of intersection of the horizontal structure with the image plane can be determined by means of the distance and the angle.

Another possibility for particularly favorable geometric quantities comprises identifying at least two points along the identified edge. Preferably, the points on the edge are far away from one another in order to obtain as accurate an angular resolution as possible.

Preferably, proceeding from these two points, a ray of which respective points in a 3D coordinate system are mapped onto the respective image point is determined in each case. These are rays from points in three-dimensional space that are mapped onto the image point. For these rays, the angle of intersection can be determined for a pair of points with one point on each of the rays. Preferably, the angle of intersection is calculated in the three-dimensional coordinate system.

The three possibilities listed above are merely examples for two geometric quantities obtained from the image that allow for determination of the angle of intersection between the image plane and the structure comprising the horizontal element. Other pairs of geometric variables are also possible.

In a preferred embodiment, the camera is directed at a load rack having one or more horizontal load rack beams. The method according to the invention is therefore particularly suitable for industrial trucks that move in spatial regions in which there is a large number of horizontal elements. A load rack with its horizontal load rack beams can be recognized in a particularly simple and reliable manner during image processing. No laborious or otherwise elaborate image processing is required for removing vertical or predominantly vertical edges from the recorded image and for determining horizontal lines or lines that are approximately horizontal depending on the orientation.

In an embodiment, the camera is mounted on the industrial truck, such that it has a defined orientation relative to the industrial truck and, in particular, relative to the longitudinal axis of the industrial truck during operation of the industrial truck as well. When being mounted, the camera is arranged at a preferably predefined orientation relative to the industrial truck. Preferably, the camera is mounted vertically on the industrial truck, such that the image plane of the camera is perpendicular to the vehicle longitudinal axis. In this way, the angle of intersection between the image plane and the line connecting the points of the pair of points can be directly converted into the angle of orientation of the vehicle longitudinal axis with respect to the horizontal element.

It has proven particularly advantageous to filter out vertical image edges from the recorded image. By filtering out said vertical edges for example before the line to the horizontal element is determined, errors during determination of the lines to the horizontal element are prevented on account of the missing vertical lines. In a preferred embodiment, a line outside the center of the image is selected for the at least one line to be evaluated. Lines outside the center of the image are viewed by the camera at a particular perspective angle that allows for a more precise evaluation of the orientation.

In an embodiment, the camera is configured as a 2D camera. In addition, the camera is calibrated, i.e. the reproduction ratios are known. A direction vector for the ray in the 3D coordinate system can be calculated for image coordinates based on the reproduction ratio. During this conversion, the two image points lying in the plane are converted into the ray, wherein all points in the 3D coordinate system that lie on the ray are mapped onto the image point by means of the camera.

It has proven particularly advantageous to work not only with a pair of points, but to use a large number of pairs of points for determining the angle of orientation and to statistically evaluate the results obtained in the same way as independent measurements, for example using the mean value.

BRIEF DESCRIPTION OF THE DRAWINGS

The invention will be explained in more detail below using an exemplary embodiment. In the figures.

DETAILED DESCRIPTION OF THE INVENTION

Figure 1:
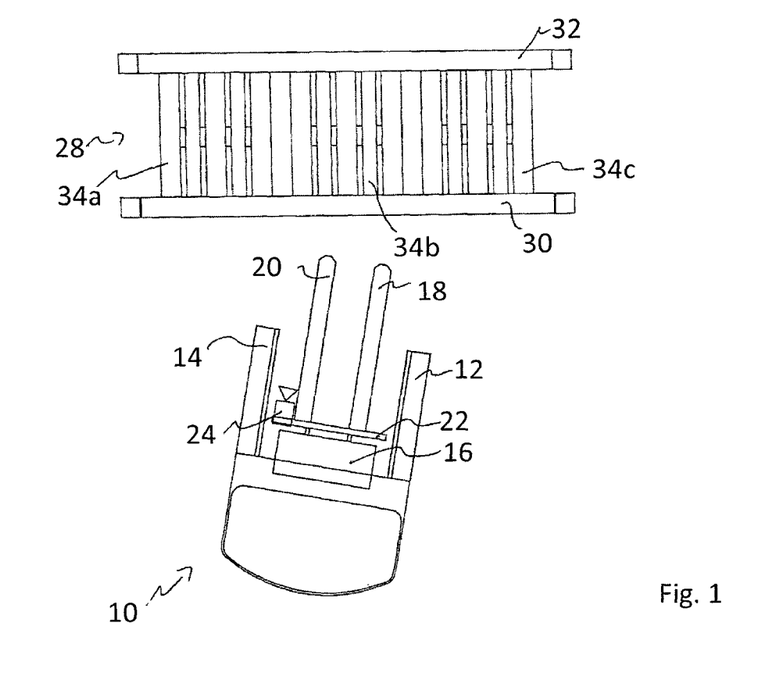
FIG. 1 illustrates a top plan view of an embodiment of an industrial truck in front of an embodiment of a load rack.

FIG. 1 is a plan view of an industrial truck 10 that is configured as a reach truck having two wheel arms 12, 14 in the example. A schematically represented lifting frame 16 having two fork tines 18, 20 as load-bearing means is located between the wheel arms 12, 14. A 2D camera 24 is mounted on the rear wall 22 of the fork tines 18, 20. The 2D camera 24 is represented schematically in FIG. 1 and can be securely mounted for use on the industrial truck such that it cannot be damaged or concealed by a transported load. In the industrial truck, it is also possible to account for the camera 24 changing position by means of the lifting frame 16. The change in position in this case include the camera 24 being raised or lowered, and in the lifting frame being shifted forward or backward relative to the wheel arms.

The industrial truck, with its longitudinal axis, is standing relative to a load rack 28 that is shown in a plan view from above. The load rack 28 has a front side 30, which the industrial truck 10 is facing. The load rack 28 also has a rear side 32 on the side facing away from the industrial truck 10. FIG. 1 shows a view onto three load aids 34a-c between the front side 30 and rear side 32. The load aids 34 are in each case pallets stored in the load rack and that are shown empty for a better overview.

Figure 2:
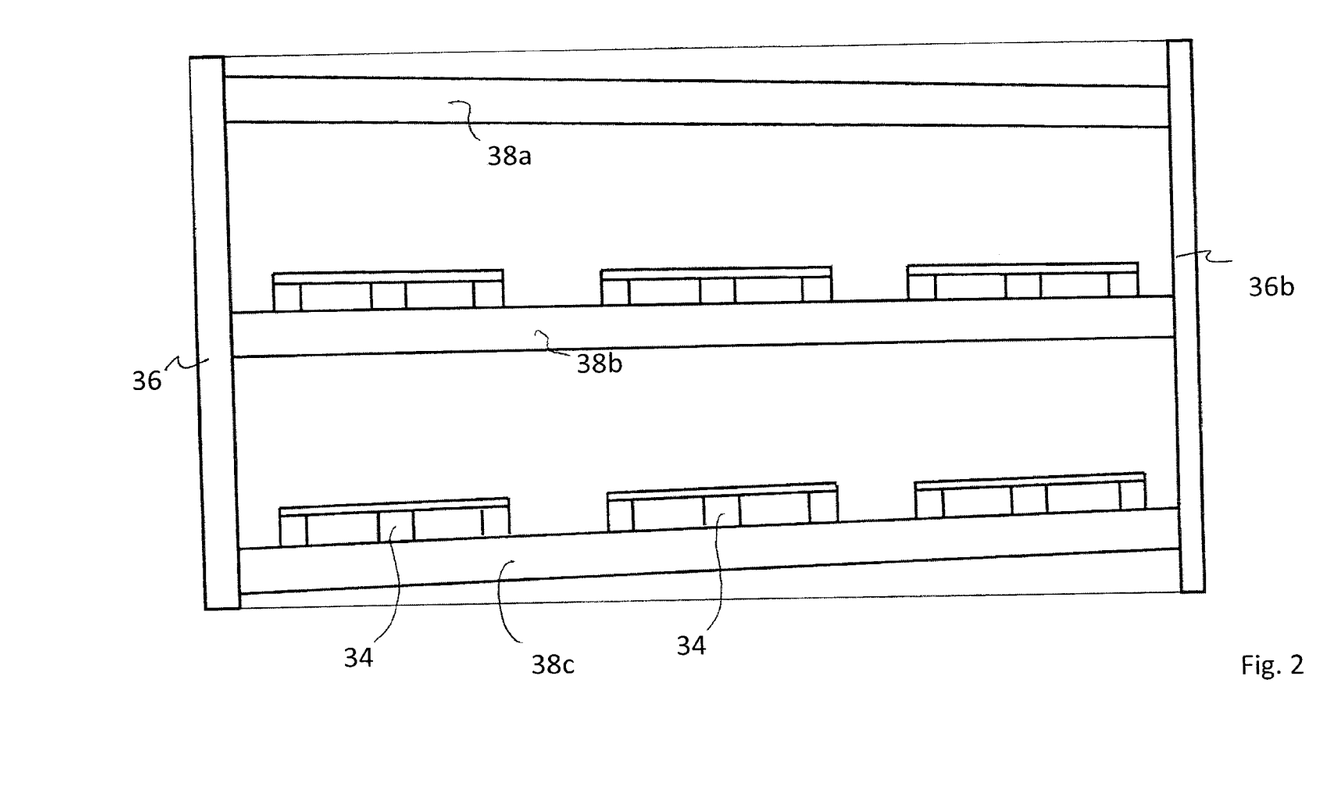
FIG. 2 illustrates an oblique view of an embodiment of the load rack.

FIG. 2 is a schematic view of an embodiment of the image of the load rack 28 generated by the 2D camera 24. The front side 30 of the load rack 28 can be seen. The front side 30 of the rack is formed of two vertical rack columns 36, 36b. Horizontally extending load rack beams 38a, b, c are arranged between the rack columns 36, 36b. The term "horizontally extending load rack beams or elements" requires explanation with regard to FIG. 2: As can easily be seen in FIG. 2, the image of the load rack beams does not extend horizontally. The left-hand side of FIG. 2 appears larger and nearer than the right-hand side of the rack 28. In other words, the image shows a perspective tapering. Nevertheless, in spite of this perspective tapering in the image, the load rack beams 38a-c are in fact horizontal. Load aids 34 are drawn into the load rack beams 38a-c. The image in FIG. 2 is a so-called gradient image, in which spatially deep regions of the image are filtered out and only the front side is shown in the image. Such reliance on the front edges facing the camera reduces the information content of the image, because depth information is lost.

Figure 3:
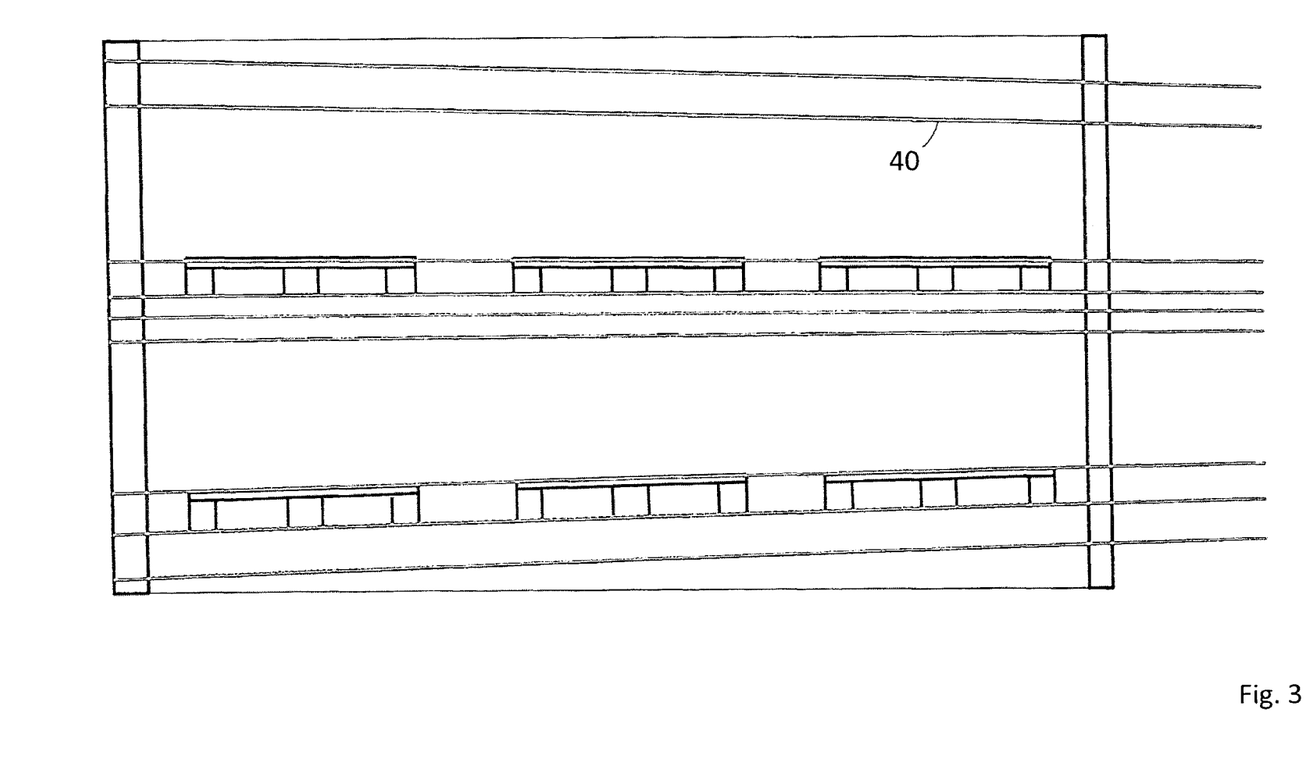
FIG. 3 illustrates the embodiment of FIG. 2 including the construction of horizontal image edges that correspond to horizontal elements.

FIG. 3 shows another step of the image processing, in which horizontal lines 40 are drawn into the image. Said lines are determined from the available image data, for example by means of edge extraction. It can be seen in FIG. 3 that the lines 40 formed do not extend in parallel with one another, but rather reflect the perspective tapering, which results from the orientation of the industrial truck relative to the rack.

Figure 4:
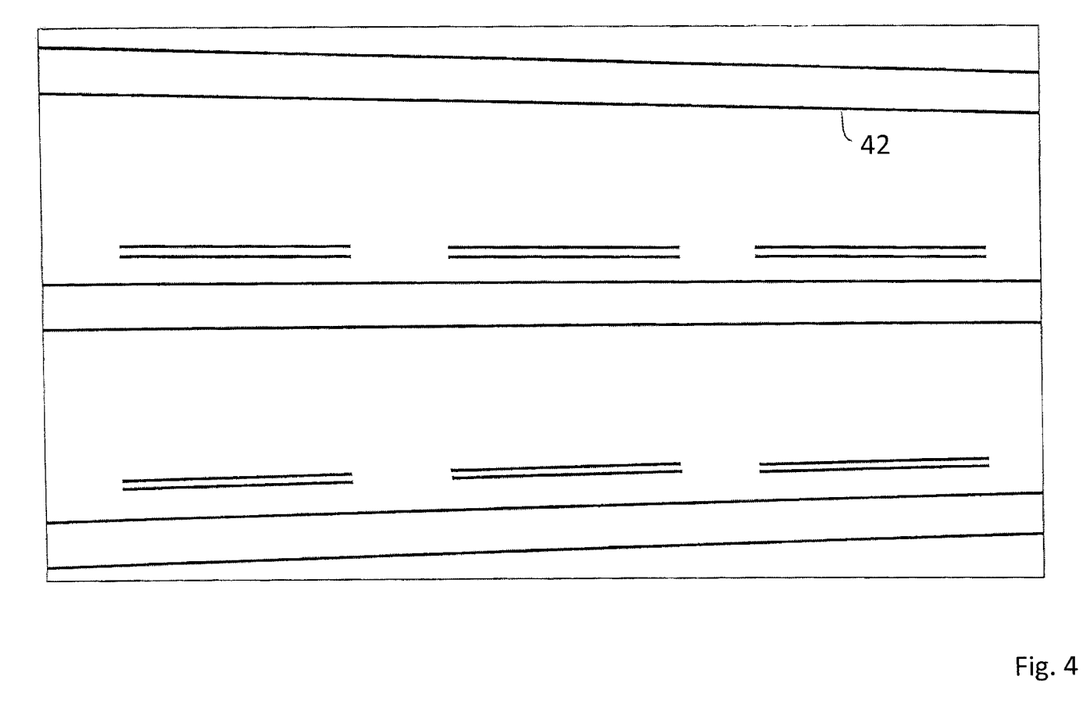
FIG. 4 illustrates the result of a first filtering process of the embodiment of FIG. 3, in which vertical lines are suppressed.

FIG. 4 shows another step, in which a first filtering process is carried out on the information-bearing edges. In this case, vertical lines are filtered out. In addition, the constructed horizontal lines 40 are once again reduced to the edges from the image.

Figure 5:
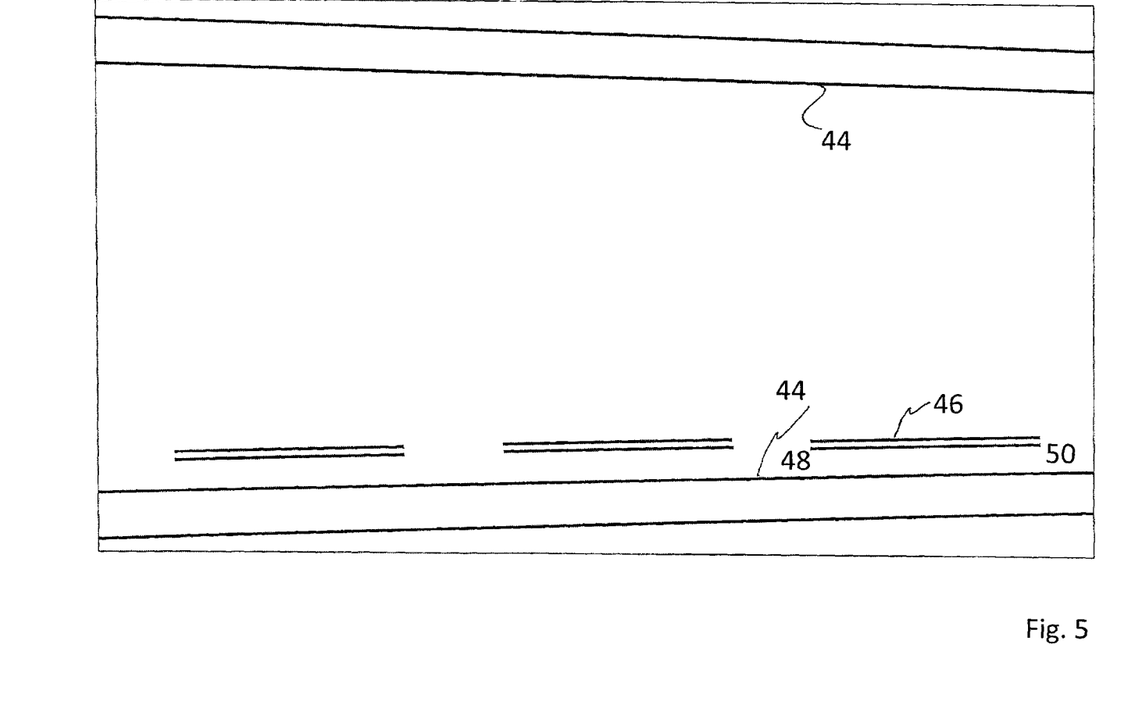
FIG. 5 shows illustrates use of the off-center horizontal image lines.

FIG. 5 shows the step in which the horizontal lines in the image, which extend approximately through the center of the image or a region around the center of the image, are removed. The information-bearing image edges 44, which show the perspective tapering most clearly, remain.

Figure 6:
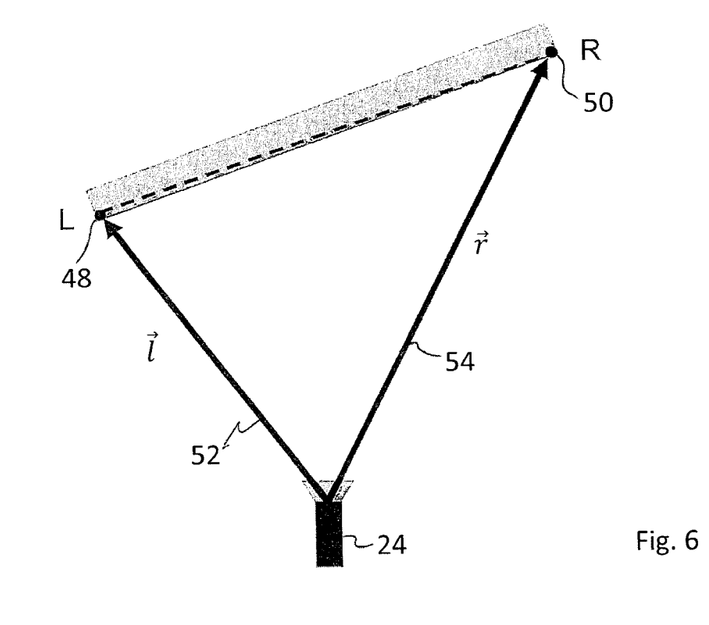
FIG. 6 illustrates an example of determining the end points L, R for a horizontal line as piercing points of a horizontal plane.

One image edge, for example the image edge 46 of a stored pallet, is picked out from these information-bearing image edges. Points, here the end points L 48 and R 50 by way of example, are determined for said image edge 46. Identifying the end points is a common step in image processing. FIG. 6 shows the geometric relationships for the end points L and R. A vector $\vec{T}$ proceeds from the camera 24 to the end point L 48. The vector $\vec{T}$ describes a ray 52 in the same way as the ray 54.

Figure 7:
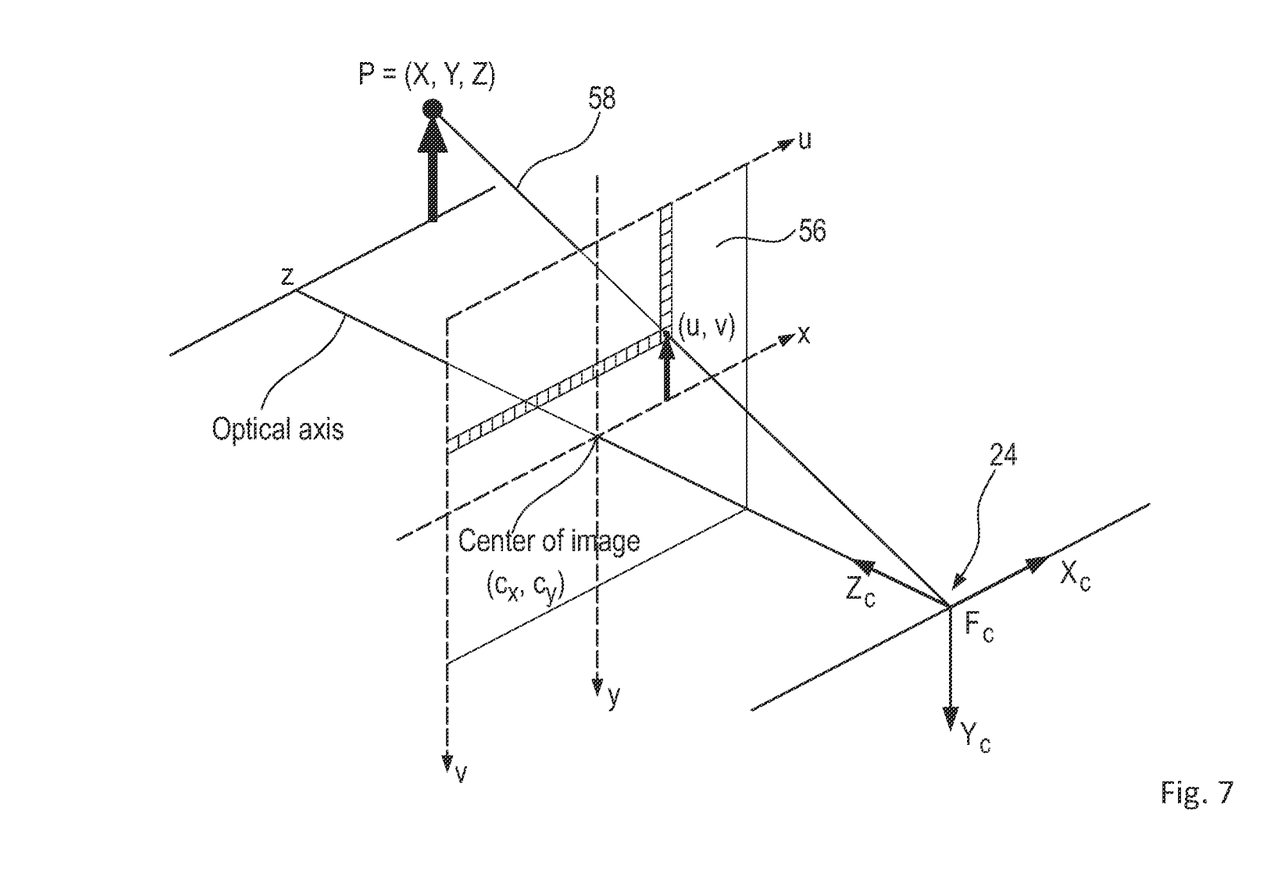
FIG. 7 illustrates an example of converting the image points in a ray with 3D coordinates.

FIG. 7 helps with understanding of the concept of the rays. FIG. 7 shows the origin Fc of the idealized camera 24. A right-handed tripod $X_c$, $Y_c$ and $Z_c$ is attached hereto. The Z-axis is the optical axis of the camera and may be considered to be in parallel with the vehicle longitudinal axis for the sake of simplicity. The camera 24 generates an image plane 56. As u-, v-coordinates, the points in the image plane 56 can be described as two-dimensional image coordinates. By way of example, an image pixel is shown in the first quadrant of the image in FIG. 7. Since the reproduction ratios of the camera 24 are known, a ray 58 can be constructed to the image point (u, v). Each point P on the ray 58 is mapped in the pixel (u, v) on the image of the camera. This system thus describes how a ray 58 can be constructed from the pixel values for a camera of which the reproduction ratios are known. FIG. 7 also clearly shows that the distance of the point P from the camera 24 cannot be determined from the image point (u,v). This is not surprising, given that the three-dimensional coordinates are mapped onto the two-dimensional image by means of the camera. For the camera 24, in order to reconstruct the ray with the possible image points P, the focal length of the camera, in particular of the three axes $X_c$, $Y_c$ and $Z_c$, must be known.

Looking back at FIG. 6, here, two direction vectors L-vector $\vec{l}$, R-vector $\vec{r}$ are shown which originate from image points that are not arranged horizontally in the image, i.e. they do not have the same v-values, i.e. row values, in the image. The distance between the end points of the two resulting rays with the L-vector $\vec{l}$ and R-vector $\vec{r}$ is not known. In principle, the rays move through three-dimensional space and each line between the two rays could correspond to the received element with the end points L, R in three-dimensional space. However, since it is known that this element is arranged horizontally, values at the same height in the 3D coordinate system can be selected. Therefore, a point having a specific value for the Y-coordinate is selected from the L-ray and from the R-ray. The connection of these two points is shown in FIG. 6. It has the course shown in FIG. 6.

Figure 8:
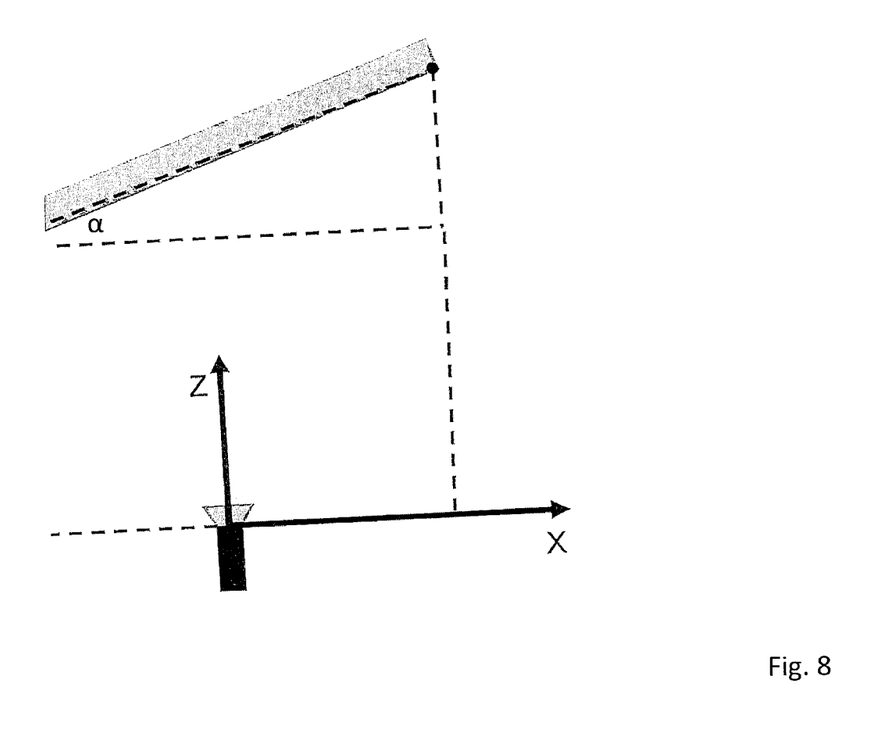
FIG. 8 illustrates an example of calculating the angle for orienting the industrial truck relative to the image plane.

FIG. 8 illustrates the final step. Here, the camera tripod is shown in the piercing plane with its X- and Z-coordinates. It is known that the two points lying on the rays L, R have the same Y-coordinate. The same coordinates are then calculated from this, as follows:

$$L(n) = n \cdot \begin{pmatrix} l_x \\ l_y \\ l_z \end{pmatrix}$$

$$R(n_2) = n_2 \cdot \begin{pmatrix} r_x \\ r_y \\ r_z \end{pmatrix}.$$

Assuming that the Y-coordinates of both rays L and R are the same, we get:

$$n \cdot l_y = n_2 \cdot r_y.$$

Simply using transformation, it follows from these two equations that the triangle shown in FIG. 8 has an adjacent side of length a for the angle $\alpha$:

$$a = n \cdot \left( r_x \cdot \frac{l_y}{r_y} - l_x \right).$$

The size of the opposite side b can also be derived directly and is given by:

$$b = n \cdot \left( r_z \cdot \frac{l_y}{r_y} - l_z \right).$$

The special feature of the approach according to the invention is that the unknown n is taken out for the calculation of the angle $\alpha$. Thus, if we consider the tangent of the angle of orientation, we get:

$$\tan(\alpha) = \frac{b}{a} = \frac{n \cdot \left( r_z \cdot \frac{l_y}{r_y} - l_z \right)}{n \cdot \left( r_x \cdot \frac{l_y}{r_y} - l_x \right)}$$

$$\tan(\alpha) = \frac{\left( r_z \cdot \frac{l_y}{r_y} - l_z \right)}{\left( r_x \cdot \frac{l_y}{r_y} - l_x \right)}.$$

The quantities contained in the equation are the coordinates from the rays that lead to the points. These coordinates are dependent on the focal length $f_x$, $f_y$ of the camera 24 in the X- and Y-direction. The procedure for calculating these coordinates from the image coordinates is well known and uses the following equation:

$$x' = x/z$$

$$y' = y/z$$

$$u = f_x \cdot x' + c_x$$

$$v = f_y \cdot y' + c_y.$$

The quantities x' and y' are auxiliary quantities which, together with the focal lengths $f_x$, $f_y$ and the center of the image $c_x$, $y_x$, are described by the depiction in the image coordinates UV. Simple transformation produces the following relationship:

$$x' = (u - c_x)/f_x$$

$$y' = (v - c_y)/f_y.$$

Together with the quantities $c_x$, $c_y$, $f_x$, $f_y$ known from the camera calibration, the ray in the three-dimensional coordinates with a direction (X', Y', 1) is obtained for the three-dimensional coordinates (X, Y, Z). It should be noted that this direction vector for the ray is not normalized, but this is not required for the further calculation.

Figure 9:
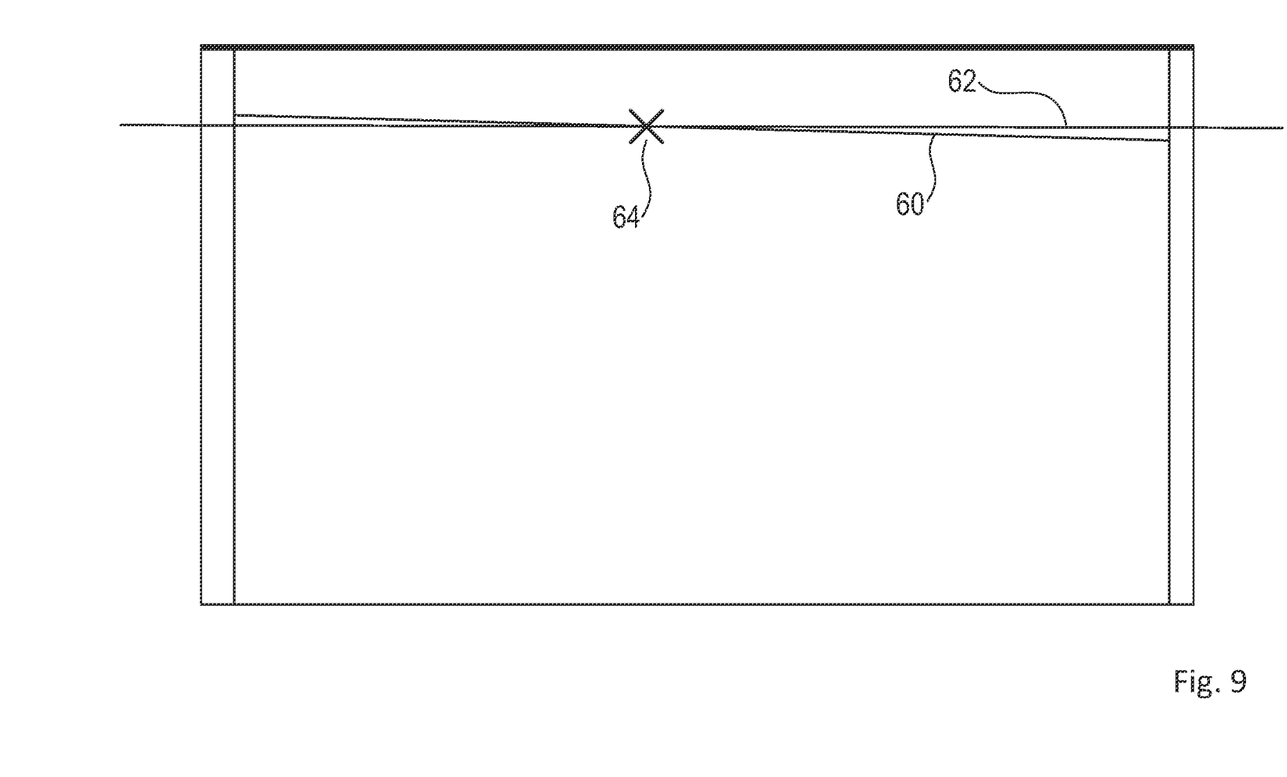
FIG. 9 schematically illustrates an edge which extends obliquely in the image and for which an image point and an angle of inclination a are determined.

The example in FIG. 9 shows an image with an edge 60 drawn in. The edge 60 is inclined with respect to the horizontal line 62. A point 64 on the edge 60 is also determined in the image. To determine said point 64, a variety of approaches may be selected. For example, the center of the edge 60 may be selected. However, a point 64 at which the enclosed image area between the edge 60 and the horizontal line 62 is the same size on both sides of the point 64 may also be selected. The evaluation of the edge 60 results in two geometric quantities, the point and the angle, which can be referred to collectively as (X, Y, $\alpha$). For the evaluation, it is now possible, for example, to look up an angle of intersection in a look-up table for the values X, Y, $\alpha$. The look-up table can be calculated in advance and is thus accessible for a quick evaluation. A look-up table can prove helpful, in particular if many edges are to be evaluated in the image.

Figure 10:
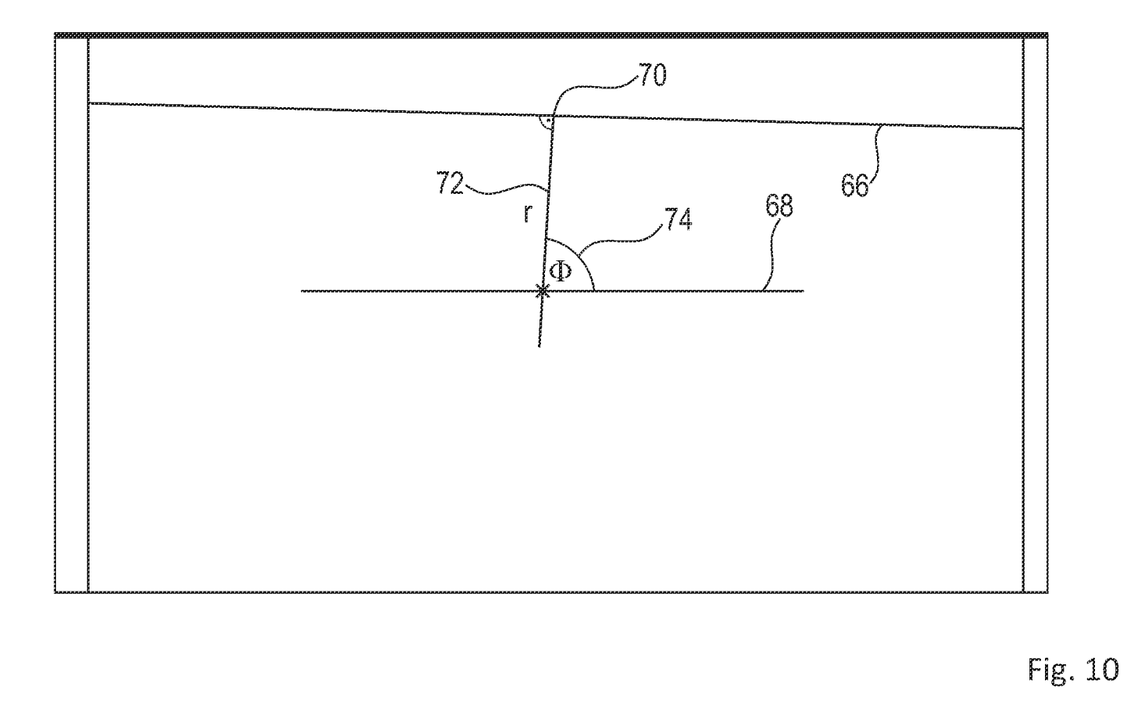
FIG. 10 illustrates and example of determining the geometric quantities as polar coordinates.

FIG. 10 shows a very similar situation to FIG. 9, in which an edge 66 extends obliquely in the image. In order to determine the two geometric quantities, a distance r, 72 and an angle φ, 74 are determined on the edge 66 proceeding from a point 70. The angle 74 is in this case defined relative to a horizontal line 68. In this example, the distance 72 is perpendicular to the edge 66. In principle, the distance could also be perpendicular to the horizontal line 68 and intersect the edge 66 at an angle of inclination.

In this approach, too, an angle of intersection is obtained from a look-up table for the geometric variables r, φ and then used. If there are different angles of intersection for multiple points 70 or multiple edges 66, these can be statistically evaluated.

LIST OF REFERENCE SIGNS

10 Industrial truck
12 Wheel arm
14 Wheel arm
16 Lifting frame
18 Fork tines
20 Fork tines
22 Rear wall
24 2D camera
28 Load rack
30 Front side of the load rack
32 Rear side of the load rack
34a-c Load aids
36a-b Rack columns
38a-c Load rack beams
40 Horizontal lines
44 Image edge
46 Image edge
48 End point L
50 End point R
52 Ray
56 Image plane
58 Ray
60 Edge
62 Horizontal line
64 Point
66 Edge
68 Horizontal line
70 Point
72 Distance r
74 Angle φ

The invention claimed is:

1. A method for determining an orientation of an industrial truck relative to a structure including at least one horizontal element, wherein the industrial truck comprises a camera that is directed at the structure, the method comprising:
recording an image of the structure with the camera, wherein the structure includes the at least one horizontal element;
determining at least two geometric quantities in the recorded image that correspond to the at least one horizontal element;
using the at least two geometric quantities to determine an angle of intersection between an image plane and a vertical plane through the at least one horizontal element;
identifying an edge in the recorded image;
identifying at least two points (L, R) along the edge in the recorded image as one of the at least two geometric quantities;
determining one ray ($\vec{l}$, $\vec{r}$) to each of the two points (L, R); and
mapping respective points of each ray in a 3D coordinate system onto a respective point (L, R) in the recorded image.

2. The method according to claim 1, wherein the at least two geometric quantities comprise two image coordinates of a reference point in the recorded image and an angle of inclination of the edge.

3. The method according to claim 2, further comprising determining the angle of inclination as an angle of the edge in the recorded image.

4. The method according to claim 1, wherein the at least two geometric quantities comprise a distance and an offset angle.

5. The method according to claim 1, further comprising determining the angle of intersection in the 3D coordinate system from at least one pair of points with one point in each ray.

6. The method according to claim 1, wherein the camera is directed at a load rack that comprises horizontal load rack beams.

7. The method according to claim 1, wherein the camera is mounted on the industrial truck.

8. The method according to claim 1, wherein the image plane of the camera has a predefined orientation on the industrial truck.

9. The method of claim 8, wherein the predefined orientation is a vertical orientation.

10. The method according to claim 1, further comprising filtering out vertical edges in the recorded image.

11. The method according to claim 10, further comprising filtering out lines in a region of a center of the recorded image.

12. The method according to claim 1, further comprising statistically evaluating a plurality of angles of intersection.

13. A method for determining an orientation of an industrial truck relative to a structure including at least one horizontal element, wherein the industrial truck comprises a camera that is directed at the structure, the method comprising:
recording an image of the structure with the camera, wherein the structure includes the at least one horizontal element;
determining at least two geometric quantities in the recorded image that correspond to the at least one horizontal element; and
using the at least two geometric quantities to determine an angle of intersection between an image plane and a vertical plane through the at least one horizontal element;
calibrating the camera;
converting a point having image coordinates (u, v) into a direction vector (x', y', 1) for a ray; and
mapping the point in a 3D coordinate system onto the respective point having the image coordinates.

14. The method according to claim 13, further comprising identifying an edge in the recorded image.

15. The method according to claim 13, wherein at least two points (L, R) along the edge in the recorded image are identified as one of the at least two geometric quantities.

* * * * *